Patented Mar. 15, 1938

2,111,469

UNITED STATES PATENT OFFICE 2,111,469

MANUFACTURE OF FORMALDEHYDE

Jacques Françon, Paris, France

No Drawing. Application December 31, 1935, Serial No. 57,063. In Great Britain January 5, 1935

10 Claims. (Cl. 260—138)

This invention relates to the manufacture of formaldehyde from carbon monoxide and hydrogen or gases containing them and has particular reference to the joint action of heat and catalytic material on a mixture of the gases when freed from impurities.

According to the present invention, the mixture of reaction gases—whether purified in any known way or by means of the special purifier or purifiers above described—is subjected to the action of a catalyst consisting of porous or finely divided nickel particles carried on a metal support and aided in their catalytic action by a small amount of another metal as promoter. A convenient metal support is of nickel, chromium or aluminium in the form of single or multiple coiled spiral strips of coiled-up gauze or the like presenting a large surface per unit of volume occupied. A convenient size of strip from which to make a coil is one about 50 to 100 mms. long and about 20 to 35 mms. wide. In addition to the nickel it is advantageous to employ small amounts, say 1 to 5 per cent. of any or all of the following metals: silver, vanadium, cobalt, copper and cadmium or alloys thereof.

In order to obtain the best results the above-mentioned catalytic material should be packed by preference in a vertical chamber or tube or group of chambers or tubes about 6 metres high, maintained at a temperature ranging from 180° to 225° C. according to the composition of the gaseous mixture to be treated, the more the hydrogen present in the mixture the lower being the temperature adopted. It may be advisable in certain cases to pass the gases through two catalytic chambers or zones maintained at different temperatures. The catalytic materials should be prepared in one or other of the following ways:—

One way of preparing the catalytic material with the nickel in the desired porous or finely divided state is to expose the supporting metal to a stream of the vapors of an organo-nickel compound under conditions which decompose the vapors and cause the nickel component to be deposited. For this purpose reduced nickel may first be exposed at a temperature of about 50° C. to a current of carbon monoxide whereby nickel tetracarbonyl (Ni(CO)₄) is produced which is carried off as a vapor by excess of the carbon-monoxide stream. These mixed gases and vapors are then directed over the above-mentioned supporting metal coils enclosed in a space and heated to at least 100° C., whereby the nickel tetra-carbonyl is decomposed

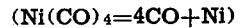

(Ni(CO)₄=4CO+Ni)

and the nascent metal becomes deposited on the coils.

An alternative and preferable way of preparing the catalytic material is to pre-oxidize the surface of the supporting metal coils or gauzes by treating them in the presence of air and then to mix them thoroughly with a nickel hydroxide paste and subject the mixture to the prolonged action of a current of dry hydrogen at a temperature of about 240° C. to 280° C. for at least 40 to 60 hours, preferably 100 hours or more, whereby the nickel hydroxide is reduced to metal in the desired physical state.

The amount of nickel paste mixed with the support is preferably such that after reduction the ratio of support to reduced nickel is about 9 to 1 in weight.

The nickel hydroxide paste may be prepared in any convenient manner as for example by treating pure nickel powder, wire, or fragments with diluted pure nitric acid, filtering, diluting the nickel nitrate solution, adding aqueous caustic soda until there is a slight alkaline reaction to litmus paper, allowing to stand, decanting by syphon the supernatant liquid containing the sodium nitrate, adding water, agitating, and decanting repeatedly to well wash the nickel hydroxide, and finally filtering—if necessary with the aid of a vacuum or pressure,—to give a suitable degree of pastiness to the mass. At this stage it is desirable to add from 1 to 5 per cent. by weight of the hydroxides of silver, vanadium, cobalt, cadmium and copper or of hydroxide mixtures derived from their alloys as already stated, preferably by precipitation from the nitrates by means of caustic soda. The paste is then mixed with the preoxidized metal support and reduced as already described.

The mixture of carbon monoxide and hydrogen or gases containing at least 30 per cent. of hydrogen, if requiring purification, especially for removal of sulphur or sulphur compounds, is passed through one or more purifiers. A suitable form of purifier consists of a tube or chamber or a group of tubes or chambers of sufficient length to ensure that the whole of the gases will have contacted with the purifying material before they leave. A satisfactory length for this purpose is 6 metres. These tubes or chambers contain layers or columns of iron, copper and nickel in the order named and preferably in the form of single or multiple coiled spiral strips, wires or coiled up gauze or the like, presenting a large surface per unit of volume occupied and arranged for contact in the order stated. These materials may or may not be mixed with a small amount of nickel paste as indicated hereafter.

It is preferable and in certain cases necessary, where the gases to be purified contain sulphur compounds, to pass the gases through two different purifiers in series; in which case the second purifying tube or chamber or group of tubes or chambers, about 6 metres long, contain a composition of fine particles of copper very thoroughly and widely dispersed in a highly porous form of carbon resulting from calcining in situ the material known as cuprene obtainable by treating finely divided copper or copper oxide with acetylene, which as is known greatly swells especially in response to a repeated treatment and at a temperature of about 200 to 280° C. or even higher, for example about 350° C.

In certain cases it may be desirable to add to this cuprene a similar material produced in the same way from nickel or cobalt and which may be termed "nicrene" to "cobrene" respectively.

Either of these materials may be mixed with a small quantity of nickel paste referred to hereinafter and the total mixture thoroughly mixed with wood charcoal as a carrier.

The series of purifiers are advantageously arranged in duplicate,—one being in purifying action while the other—which has become charged with impurities in the course of a previous operation—is being reduced and freed from accumulated impurities—the first series being reactivated by means of air and the second by means of steam passed through in the reverse direction to the direction in which the reacting gases had passed. In the case of a purifier containing iron, copper and nickel in the order named as already described, it is maintained at a temperature of about 300 to 350° C. and in the case of a purifier packed with calcined cuprene, "nicrene" or "cobrene", it is maintained also at a temperature of about 300 to 350° C. The purified gases coming from the purifier or purifiers are then passed at substantially atmospheric pressure through the above described catalyst chamber or tube or nest of tubes about 6 metres long maintained at a temperature between 180 and 225° C. Frequent regeneration of the catalyst is necessary and this may be effected either by passing the gaseous mixture for a short time, for example for a few minutes, over the catalytic material then interrupting the passage and reactivating the catalyst by means of a current of a suitable regenerating gas, or by employing a suitable reactivating gas together with the reacting gases so as to cause regeneration simultaneously with the production of the formaldehyde. The reactivating gases employed may be nitrogen or oxides of nitrogen or any other gas, e. g. carbon dioxide, hydrogen or water vapor, not forming a stable compound with the catalytic material. Water vapor is particularly suitable for use as a reactivating gas together with the reacting gases.

As an example, when a mixture of carbon monoxide and hydrogen is passed at a velocity of one metre per second over the catalyst, the time of reaction may be two minutes, followed by a period of reactivation of forty seconds. The reaction is preferably effected at atmospheric pressures, but if desired pressures higher than atmospheric may be employed.

What I claim is:

1. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support and aided in their catalytic action by a small amount of a metal promoter taken from the group consisting of silver, vanadium, cobalt, cadmium and copper.

2. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support consisting of a metal taken from the group consisting of nickel, chromium and aluminum and aided in their catalytic action by a small amount of a metal promoter taken from the group consisting of silver, vanadium, cobalt, cadmium and copper.

3. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support and aided in their catalytic action by 1 to 5% of a metal promoter taken from the group consisting of silver, vanadium, cobalt, cadmium and copper.

4. The method of producing formaldehyde from carbon monoxide and hydrogen which comprises bringing a mixture of carbon monoxide and hydrogen, freed from catalyst poisons, at a temperature ranging from 180 to 225° C. into contact with catalytic material consisting of nickel particles deposited on a metal support consisting of a metal taken from the group consisting of nickel, chromium and aluminum and aided in their catalytic action by 1 to 5% of a metal promoter taken from the group consisting of silver, vanadium, cobalt, cadmium and copper.

5. A catalyst for use in the production of formaldehyde from carbon monoxide and hydrogen, said catalyst consisting of nickel particles deposited on a metal support, and a small amount of a metal promoter taken from the group consisting of silver, vanadium, cobalt, cadmium and copper for aiding the catalytic action of the nickel particles.

6. A catalyst for use in the production of formaldehyde from carbon monoxide and hydrogen, said catalyst consisting of nickel particles deposited on a metal support consisting of a metal taken from the group consisting of nickel, chromium and aluminum, and a small amount of a metal promoter taken from the group consisting of silver, vanadium, cobalt, cadmium and copper for aiding the catalytic action of the nickel particles.

7. A catalyst for use in the production of formaldehyde from carbon monoxide and hydrogen, said catalyst consisting of nickel particles deposited on a metal support consisting of a metal taken from the group consisting of nickel, chromium and aluminum, and 1 to 5% of a metal promoter taken from the group consisting of silver, vanadium, cobalt, cadmium and copper for aiding the catalytic action of the nickel particles.

8. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support and aided in their catalytic action by a small amount of a metal promoter taken from the group consisting of silver, vanadium, cobalt, cadmium and copper, and discontinuing the production intermittently in order to reactivate the catalyst by means of a regenerating gas.

9. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support and aided in their catalytic action by a small amount of a metal promoter taken from the group consisting of silver, vanadium, cobalt, cadmium and copper, and adding a regenerating gas to the gaseous reaction mixture so as to regenerate simultaneously with the main reaction.

10. The method of producing formaldehyde from carbon monoxide and hydrogen which comprises bringing a mixture of carbon monoxide and hydrogen, freed from catalyst poisons, at a temperature ranging from about 180° C. to about 225° C. into contact with catalytic material consisting of nickel particles deposited on a metal support and aided in their catalytic action by a small amount of a metal promoter taken from the group consisting of silver, vanadium, cobalt, cadmium and copper, and reactivating the catalyst by means of a regenerating gas.

JACQUES FRANÇON.